(12) United States Patent
Jacob

(10) Patent No.: US 8,395,657 B2
(45) Date of Patent: Mar. 12, 2013

(54) METHOD AND SYSTEM FOR STITCHING TWO OR MORE IMAGES

(75) Inventor: Stephane Jean-Louis Jacob, Floirac (FR)

(73) Assignee: Photint Venture Group Inc., Road Town (VG)

( * ) Notice: Subject to any disclaimer, the term of this patent is extended or adjusted under 35 U.S.C. 154(b) by 723 days.

(21) Appl. No.: 12/527,044

(22) PCT Filed: Feb. 14, 2008

(86) PCT No.: PCT/IB2008/000332
§ 371 (c)(1),
(2), (4) Date: Aug. 13, 2009

(87) PCT Pub. No.: WO2008/099269
PCT Pub. Date: Aug. 21, 2008

(65) Prior Publication Data
US 2010/0097526 A1    Apr. 22, 2010

(30) Foreign Application Priority Data
Feb. 14, 2007    (IN) .............................. 306/DEL/2007

(51) Int. Cl.
*H04N 7/00* (2006.01)
(52) U.S. Cl. .......................................... 348/36; 382/284
(58) Field of Classification Search .................. 348/36; 282/284
See application file for complete search history.

(56) References Cited

U.S. PATENT DOCUMENTS

| 5,321,748 | A | 6/1994 | Zeidler et al. |
| 6,111,597 | A * | 8/2000 | Tabata ............................. 348/43 |
| 6,147,709 | A | 11/2000 | Martin et al. |
| 6,252,603 | B1 * | 6/2001 | Oxaal ........................... 345/427 |

(Continued)

FOREIGN PATENT DOCUMENTS

| EP | 0633703 A | 1/1995 |
| EP | 0949815 A | 10/1999 |

(Continued)

OTHER PUBLICATIONS

"PCT International Search Report dated Apr. 11, 2009 for PCT/IB2008/000332, from which the instant application is based," 4 pgs.

(Continued)

*Primary Examiner* — Alina N. Boutah
(74) *Attorney, Agent, or Firm* — Fredrikson & Byron, P.A.

(57) ABSTRACT

A method and system for stitching two or more images to generate a resultant image of good quality is disclosed. The disclosed method and system represents a way to stitch two or more images captured through fisheye lenses. The method and system converts two fisheye hemispherical images to two triangles, which are thereafter stitched together to form a rectangular image. Herein each single pixel in the hemispherical images at the beginning represents one single pixel in the resultant rectangular figure at the end of the process. Thus, the resultant stitched image comprises of the same concentration of pixels at the end as was in the initial images to be stitched and occupies lesser storage space than equirectangular images or videos.

17 Claims, 7 Drawing Sheets

U.S. PATENT DOCUMENTS

| | | | |
|---|---|---|---|
| 6,271,853 B1* | 8/2001 | Oxaal | 715/848 |
| 6,323,862 B1* | 11/2001 | Oxaal | 345/581 |
| 6,750,873 B1* | 6/2004 | Bernardini et al. | 345/582 |
| 6,795,090 B2 | 9/2004 | Cahill et al. | |
| 6,947,059 B2* | 9/2005 | Pierce et al. | 345/629 |
| 7,527,383 B2* | 5/2009 | Hirata et al. | 353/69 |
| 8,090,197 B2* | 1/2012 | Fukasawa | 382/162 |
| 2001/0040342 A1* | 11/2001 | Matos | 273/157 R |
| 2002/0060675 A1* | 5/2002 | Hashimoto | 345/204 |
| 2002/0147991 A1 | 10/2002 | Furlan et al. | |
| 2003/0038933 A1* | 2/2003 | Shirley et al. | 356/243.1 |
| 2003/0039395 A1* | 2/2003 | Rondinelli et al. | 382/232 |
| 2003/0117675 A1* | 6/2003 | Shirato et al. | 358/505 |
| 2004/0155878 A1* | 8/2004 | Inazumi | 345/423 |
| 2004/0189876 A1* | 9/2004 | Shirato | 348/700 |
| 2004/0247174 A1* | 12/2004 | Lyons et al. | 382/154 |
| 2005/0018058 A1* | 1/2005 | Aliaga et al. | 348/239 |
| 2005/0206857 A1* | 9/2005 | Yamada | 353/94 |
| 2005/0280831 A1* | 12/2005 | Fujiwara et al. | 356/603 |
| 2006/0033820 A1* | 2/2006 | Honda et al. | 348/218.1 |
| 2006/0193535 A1* | 8/2006 | Mishima et al. | 382/294 |
| 2006/0291014 A1* | 12/2006 | Hirata et al. | 358/504 |
| 2007/0091086 A1* | 4/2007 | Fenney et al. | 345/423 |
| 2007/0257936 A1* | 11/2007 | Goda et al. | 345/611 |
| 2008/0012850 A1* | 1/2008 | Keating, III | 345/419 |
| 2008/0253685 A1* | 10/2008 | Kuranov et al. | 382/284 |
| 2009/0067728 A1* | 3/2009 | Mishima et al. | 382/218 |
| 2009/0144173 A1* | 6/2009 | Mo et al. | 705/27 |

FOREIGN PATENT DOCUMENTS

| | | |
|---|---|---|
| JP | 06052633 A | 2/1994 |
| JP | 2001275111 A | 10/2001 |
| WO | 0108412 A | 2/2001 |

OTHER PUBLICATIONS

"PCT Written Opinion dated Apr. 11, 2009 for PCT/IB2008/000332, from which the instant application is based," 6 pgs.

"PCT International Search Report dated Jul. 28, 2008 for PCT/IB2008/000334," 5 pgs.

"PCT Written Opinion dated Jul. 28, 2008 for PCT/IB2008/000334," 6 pgs.

"Pseudocylindrical Projections" [Online] Nov. 2006, XP002523717, Retrieved from the Internet: URL:htt;P//web.archive.org/web/20061119174921/http://www.progonos.com/furuti/MapProj/Dither/ProjPCyl/projPCy].html> [retrieved on Apr. 14, 2009] Section "Collignon Projection" (six pages).

"Conformal Projections"[Online] Nov. 2006, XP002523718 Retrieved from the Interneta; USL:http://web.archive.org/web/20061119162502/www.progonos.com/furuti/MapProj/Normal/ProjConf/projConf.html> [retrieved on Apr. 14, 2009] section "World Maps by Adams" figure "Adams' world in a square (1929)" (ten pages).

Zelnik-Manor, L. et al., "Squaring the circle in panoramas," Proceedings. Tenth IEEE International Conference on Computer vision IEEE Comput. Soc. Los Alamitos, CA, USA, vol. 2, 2005, pp. 1292-1299 vol. XP00252371 (eight pages).

Li, S.: "Full-view spherical image camera," Proceedings—International Conference on Pattern Recognition—Proceedings—18th International Conference on Pattern Recognition, ICPR 2006 2006 Institute of Electrical and Electronics Engineers Inc., US, vol. 4, 2006, pp. 386-390, XP002523601 (five pages).

German, D.M., et al., "New methods to project panoramas for practical and aesthetic purposes," Computational Aesthetics in Graphics, Visualization, and Imaging, 2007, Jun. 2007, pp. 13-22, XP002523600 (eight pages).

* cited by examiner

METHOD AND SYSTEM FOR STITCHING TWO OR MORE IMAGES

RELATED APPLICATIONS

This application is a 35 U.S.C. 371 national stage filing from International Application No. PCT/IB2008/000332 filed Feb. 14, 2008 which claims priority to Indian Application No. 306/DEL/2007 filed Feb. 14, 2007 the teachings of which are incorporated herein by reference.

FIELD OF INVENTION

The instant invention relates generally to the field of computer graphics and image processing, and in particular to techniques for generating at least one good quality image from a plurality of original images.

BACKGROUND OF THE INVENTION

Immersive visual technology provides for a virtual interactive experience of viewing an image and, mote particularly, inserting an image into another image to produce a realistic immersive experience. Combining multiple images through immersive visual techniques creates a panoramic image, one that covers a wider field of view than would be possible with a conventional camera lens. The common device to capture circular hemispherical still images is a digital camera equipped with a fisheye lens. Such images contain extremely sharp and remarkable amounts of detail. Generally, immersive technology involves interactive photography based upon digital input to a computer processor of photographic images obtained using standard wide angle or fisheye lenses or mirrors to reflect a wide-angle image into a standard lens. The digital processing involves removing any mirror, wide angle or fisheye lens distortion and providing a perspective corrected image portion for viewing at the user's command.

A Fisheye lens used in immersive visual systems is a wide-angle lens that takes in an extremely wide, circular image. Fisheye lens is known in the field of photography for its unique distorted appearance produced in the captured image. The Fisheye lens provides a 180 degree view in an image or a video. The view is usually somewhat distorted, although the distortion may be sufficiently corrected using techniques known in the art. For providing a good immersive experience to a user, a number of immersive visual systems and methods have been proposed.

U.S. Pat. No. 6,947,059 discloses an imaging system comprising a plurality of image capturing devices for stitching and transforming to produce full motion stereoscopic equirectangular image. The method comprises the steps of obtaining a plurality of images, combining portions of first and second image to produce first combined equirectangular image, combining portions of different portion of first image with a portion of the third image to produce second combined equirectangular image and displaying first and second combined equirectangular image in a matter to produce a stereoscopic image.

U.S. Pat. No. 6,147,709 discloses a method for inserting a high-resolution image into a low-resolution image to produce Immersive experience. The method as disclosed by the above patent includes capturing a low resolution image, capturing a high resolution image, dewarping the low resolution using image transformation process, magnifying the details in the image, overlaying the high resolution image, matching pixel values and representing at least three points in high resolution image with three different corresponding values in the low-resolution image.

U.S. Pat. No. 6,795,090 provides a method and system for generating intermediate panoramic images from two original panoramic images, where each panoramic image provides a 360 degree field of view of a scene from different nodal points. First, pairs of planar images are derived, where each pair corresponds to original planar views derived from respective portions of the original panoramic images, where a similar area of the scene is visible from each pair of planar views. Then, an intermediate planar image is generated from each pair of planar images, and the resulting series of intermediate planar images are cylindrically concatenated to form the intermediate panoramic image.

Although the above patents disclose processes and systems to combine or immerse two or more images, none of them provides a flexibility to allow the end image to be displayed on a small screen. This is due to the fact that in most of the known immersive visual systems, stitching of two or more images results in an enlarged equirectangular image. As a result, the resultant image or video requires greater storage space. Moreover, the quality of the end image or video is usually below user expectations. Hence, there is a need for a method and system which facilitates reduction of size of the image file after stitching of two or more images. Also, such a method and system for stitching of two or more images should produce a resultant image of good quality.

OBJECTS AND SUMMARY OF THE INVENTION

The present invention has the objective to provide an efficient method and system for stitching two or more still and/or moving images to produce a resultant image of good quality.

It is also an objective of the instant invention to provide a method and system for stitching two or more still and/or moving images to produce a resultant image with the same pixel concentration as the original images.

It is yet another objective of the invention to provide a method and system for stitching two or more still and/or moving images to produce a resultant output of reduced file size.

To achieve the aforesaid objectives the instant invention provides a method for stitching two or more images comprising the steps of:
  a. capturing two or more images from at least one point and different directions of view by an image capture means to result in hemispherical images;
  b. converting each hemispherical image into a corresponding triangular image;
  c. orienting at least an first triangular image along an edge of at least a second triangular image wherein an edge of the first triangular image corresponds to the edge of the second triangular image;
  d. combining common points on the edge of the first triangular image with the corresponding points on the edge of the second triangular image to form a single stitched rectangular image.

The instant invention further provides a system for stitching two or more images comprising:
  image capture means for capturing two or more hemispherical images from at least one point and different directions of view; and
  image processing means coupled to the image capture means to convert two or more hemispherical images into triangular images and combine the triangular images into a single rectangular image.

The above objectives have been disclosed in the specification so as to clarify the invention closely. However, the scope of the above invention should not be constrained or limited by the above objectives and/or advantages.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF DRAWINGS

A method and system for stitching two or more images to generate a resultant image of good quality is described. The system and methods are not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

In order to stitch two or more images captured through fisheye lenses efficiently, a system and method is required which produces a resultant image of good quality. Moreover, such a system should provide an alternative to the usual equirectangular images or videos which occupy a lot of storage space. To this effect, the disclosed method and system of the instant invention provides stitching of two or more images captured by a wide angle lens such as a fisheye lens. Herein two or more still images or videos are captured by any type of fisheye lens to result in hemispherical shape. Each hemispherical image is thereafter converted into an equitriangular image or video.

Conversion of hemispherical images to triangular images is followed by stitching of the two triangular images. The stitching of the two triangular images results in the formation of a rectangular image. In the resultant rectangular image, each single pixel at the beginning represents one single pixel at the end of the process, thus, comprising the same concentration of pixels at the end as was in the initial images to be stitched. Thus, the disclosed method and system of the instant invention result in a stitched image of superior quality with all the original details intact. Moreover, a reduction of size of the image file-size after stitching of two or more images is also achieved without any compression resulting in lossless conversion as compared to equirectangular images.

The techniques described herein may be used in many different operating environments and systems. An exemplary environment that is suitable for practicing various implementations is discussed in the following section with respect to the accompanying figures.

Exemplary System

Figure 1:
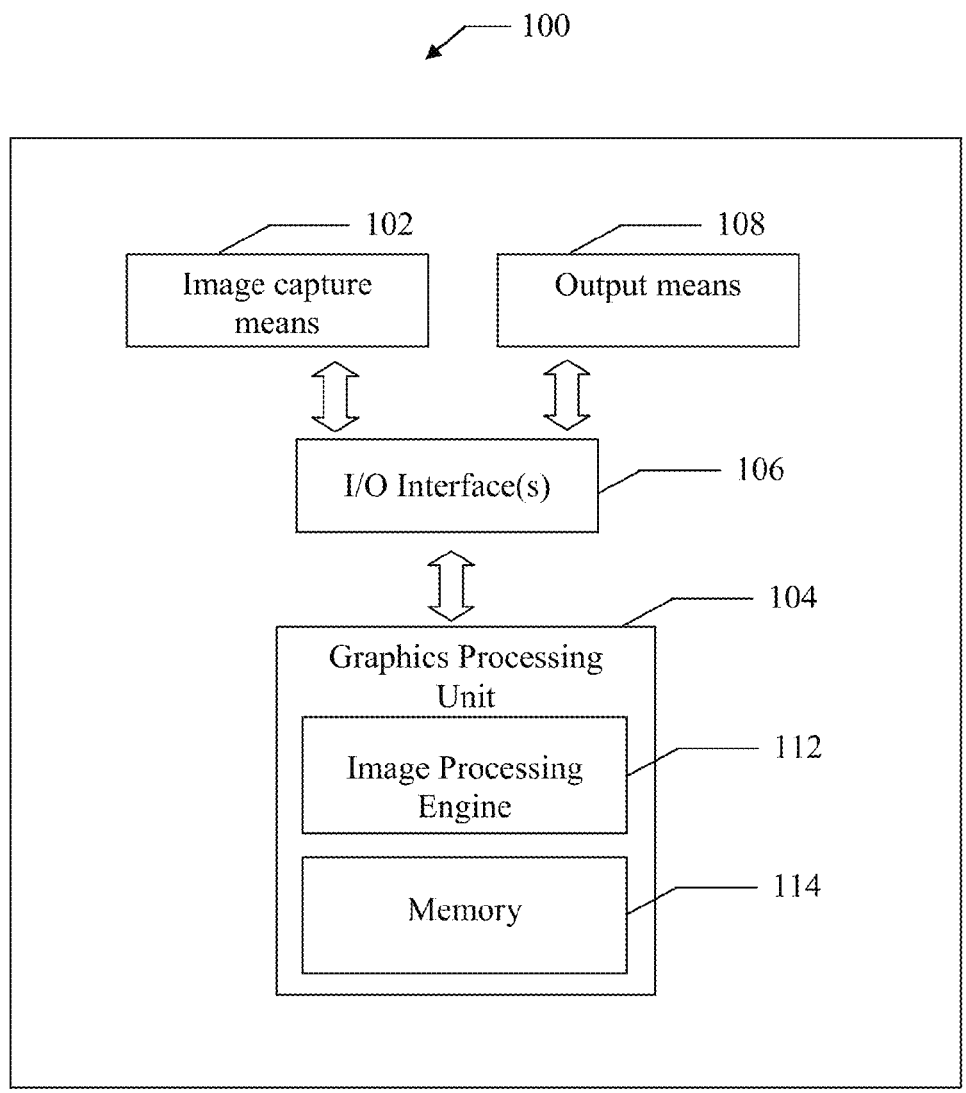
FIG. 1 illustrates an exemplary system for stitching two or more images to generate a resultant image of good quality as disclosed in the instant invention.

FIG. 1 illustrates an exemplary system 100 for stitching two or more images to generate a resultant image of good quality. According to an embodiment, exemplary system 100 can include one or more image capture means 102 coupled to one or more graphical processing units 104 coupled to one or more I/O interface(s) 106 and one or more output means 108. Image capture means 102 can be a digital video camera equipped with one or more fisheye lens or adaptors. The fisheye lens can be a circle fisheye lens in order to obtain at least 180 degrees×180 degrees of field of view per image.

In alternate embodiments, image capture means 102 can be accessible over a communication network coupled to system 100. Image capture means 102 can further include means to digitize the images before transferring to the graphical processing unit 104 through I/O interfaces 106. Alternately, the digitizing means may be coupled to the disclosed system 100 through I/O interfaces 106.

I/O interfaces 106 can provide input output capabilities for system 100. I/O interfaces 106 can include one or more ports for connecting, input devices, output devices, analog and digital converters and so on. I/O interfaces 106 can be configured for receiving captured images through one or more image capture means 102 and converting the same into relevant format for further processing by the graphics processing unit 104. The resultant image generated by the graphics processing unit 104 can be sent to output means 108 through I/O interfaces 106. For example, I/O interfaces 106 can facilitate delivery of the images to the graphical processing unit 104 using all existing ways known like Flash disk, USD connection, WIFI connection.

Graphical processing unit 104 can be a single processing entity or a plurality of processing entities comprising multiple computing units. Graphical processing unit 104 can include an image processing engine 112 coupled to memory 114. In alternate embodiments, memory 114 can reside outside graphics processing unit 104 as a separate entity or can be accessible over a communication network coupled to system 100. Memory 114 can include, for example, volatile memory (e.g., RAM) and non volatile memory (e.g., ROM, flash memory, etc.). Memory 114 can store the received, intermediate and final images and related information. Memory 114 can further include operational instructions and relevant data that can be executed by the image processing engine 112 during the disclosed process of stitching two or more images.

Image processing engine 112 can receive images captured by image capture means 102 in relevant format. At least two images have to be taken in order to obtain a full 360×180 field of view combining at least two images. The captured images have to be in progressive scan format in order to be at least 24 bits color depths, and need to be in an understandable multimedia file format. This file can be a raster image, a succession of raster images or a video file with a minimum of compression to maintain a good quality during all the stitching process. In the case of the original source file is a video and is interlaced, then the interleave needs to be removed using techniques known in the art. Alternately, the image processing engine 112 can process the images received from image capture means 102 to result in hemispherical images. Further, image processing engine 112 can extract a plurality of information from each hemispherical image. Image processing engine 112 can use the extracted information for converting the hemispherical images into equivalent triangular images and their subsequent stitching and orientation. The disclosed process ensures that the resultant rectangular image will be of the same pixel concentration as the original images, thus ensuring lossless conversion as compared to equirectangular images currently known in the art. Subsequently, image processing engine 112 sends the resultant stitched image to output means 108 for display. In a preferred embodiment, output means 108 can be a display screen and/or printing device coupled to system 100. In alternate embodiments, output means 108 can be accessible over a communication network coupled to system 100.

System 100 can be implemented as a standalone system or can be implemented as a system connected in a network. On initialization, graphics processing unit 104 can load the images captured by the image capture means 102, operational instructions and other relevant data and into memory 114. Image processing engine 112 extracts a plurality of information from each image including the coordinate values of each hemispherical image and corresponding points of two or more images. Image processing engine 112 further uses the operational instructions stored in memory 114 to convert the hemispherical image into an equivalent triangular image. Further, image processing engine 112 rotates at least one of the triangular images by 180 degrees and combines with at least a second triangular image along a common base to generate a stitched image. Further, image processing engine 112 facilitates the correction in orientation of the stitched image to generate a rectangular image of the same pixel concentration as the original images. The final image is sent to output means 108 through I/O interfaces 106. The final image generated by the disclosed system of the instant invention is found to be of superior quality as it retains the same number of pixels and hence the same amount of detail as the original images. Further, there is a reduction in the size of the output file by about 22 percent without using any compression techniques resulting in more efficient storage as compared to a standard equirectangular image.

Exemplary Method

Figure 2:
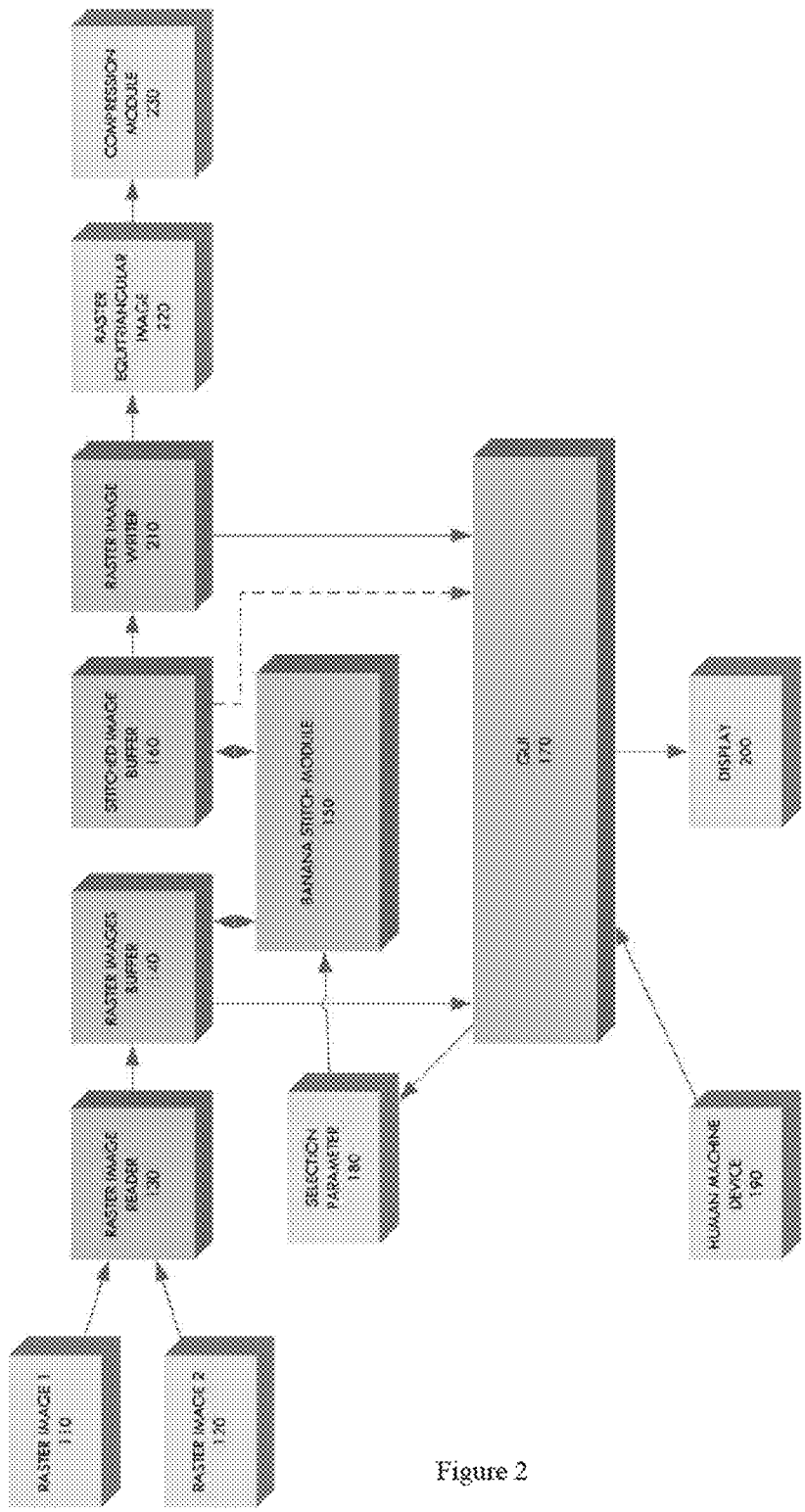
FIG. 2 illustrates a flow diagram of an exemplary method for stitching two or more images to generate a resultant image of good quality as disclosed in the instant invention using the Banana Stitching process.

Exemplary method for stitching two or more images to generate a resultant image of good quality is described. FIGS. 2-8 are illustrated as a collection of blocks in a logical flow graph and/or simplified diagrams, which represent a sequence of operations that can be implemented in hardware, software, or a combination thereof. In the context of software, the blocks represent computer instructions that, when executed by one or more processors, perform the recited operations. The order in which the process is described is not intended to be construed as a limitation, and any number of the described blocks can be combined in any order to implement the process, or an alternate process. Additionally, individual blocks may be deleted from the process without departing from the spirit and scope of the subject matter described herein FIG. 2 illustrates a block diagram of an exemplary method system for stitching two or more images to generate a resultant image of good quality as disclosed in the instant invention using the Banana Stitching process.

In a preferred embodiment, two source files are used. Theses images are two raster images representing two fisheye images captured using two fisheye lenses mounted on two digital cameras disposed back to back. Each lens has at least 180 degrees of field of view. Theses images are two images captured of the same environment in any given instant of time. The color depth can be 24 bits, 32 bits or indexed color.

The two images RASTER IMAGE 1 (110) and RASTER IMAGE 2 (120) are loaded into the RASTER IMAGE READER (130) using methods known in the art. The two raster images are then be uncompressed and buffered into RASTER IMAGES BUFFER (140). The RASTER IMAGES BUFFER (140) is accessed by multiple elements of the systems. The input raster information is provided by the RASTER IMAGE READER (130). The parameters relative to the image selection are provided by the SELECTION PARAMETER module (180) through (150). The output information is raster images sent to the BANANA STITCH MODULE (150). RASTER IMAGES BUFFER (140) is as well connected to the GUI (Graphic User Interface) (170).

The GUI (170) is the visual link between RASTER IMAGES BUFFER (140),

RASTER IMAGES WRITER (210), SELECTION PARAMETER (180), HUMAN MACHINE DEVICE (190) and DISPLAY (200). It could be connected to the STITCHED IMAGES BUFFER (160) to accelerate the process. GUI is in interaction with the human machine device (190) where the user interacts with the system. As the GUI displays the two raw images (110) and (120) through the raster images buffer (140), the end user makes a selection on those images to determine the area of each image that has to be stitched together. The common shape of selection is a circle where the user can determine the center and the ray. Different shapes could be used to make that selection. This information is input by the HUMAN MACHINE DEVICE (190) and is provided and formatted by the SELECTION PARAMETER (180). The module (180) then sends the selection information to the BANANA STITCH MODULE (150) that collects the needed raster information in (140) and processes them to deliver the processed image to the STITCHED IMAGE BUFFER (160). The functioning of the Banana Stitch Module (150) is disclosed below in the description of FIG. 4.

The STITCHED IMAGE BUFFER (160) collects the equitriangular image from the

BANANA STITCH MODULE (150). At this step, the information is a raster image. The information is then written by RASTER IMAGE WRITER (210) in an existing format such as BMP, JPG TGA etc., and sent in parallel to the GUI (170) for display. In (220), the RASTER EQUITRIANGULAR IMAGE can then be processed as multiple frames and compressed as a video in the COMPRESSION MODULE (230). The processes disclosed herein above have to be performed for each and every frame of the images.

Figure 3:
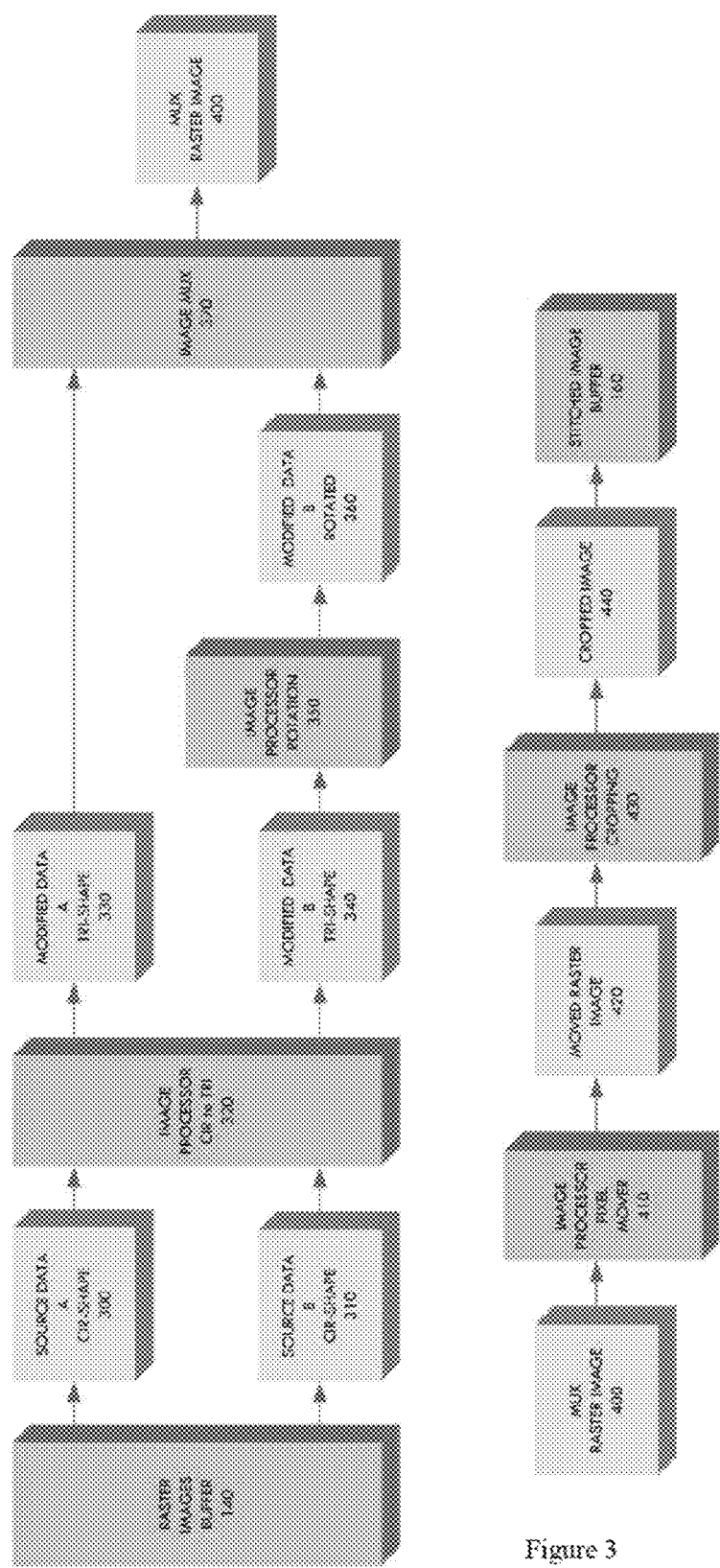
FIG. 3 illustrates a block diagram of an exemplary implementation of the BANANA STITCH MODULE (150) disclosed in the description of FIG. 2.

FIG. 3 illustrates a block diagram of an exemplary implementation of the BANANA STITCH MODULE (150) disclosed in the description of FIG. 2.

Figure 7:
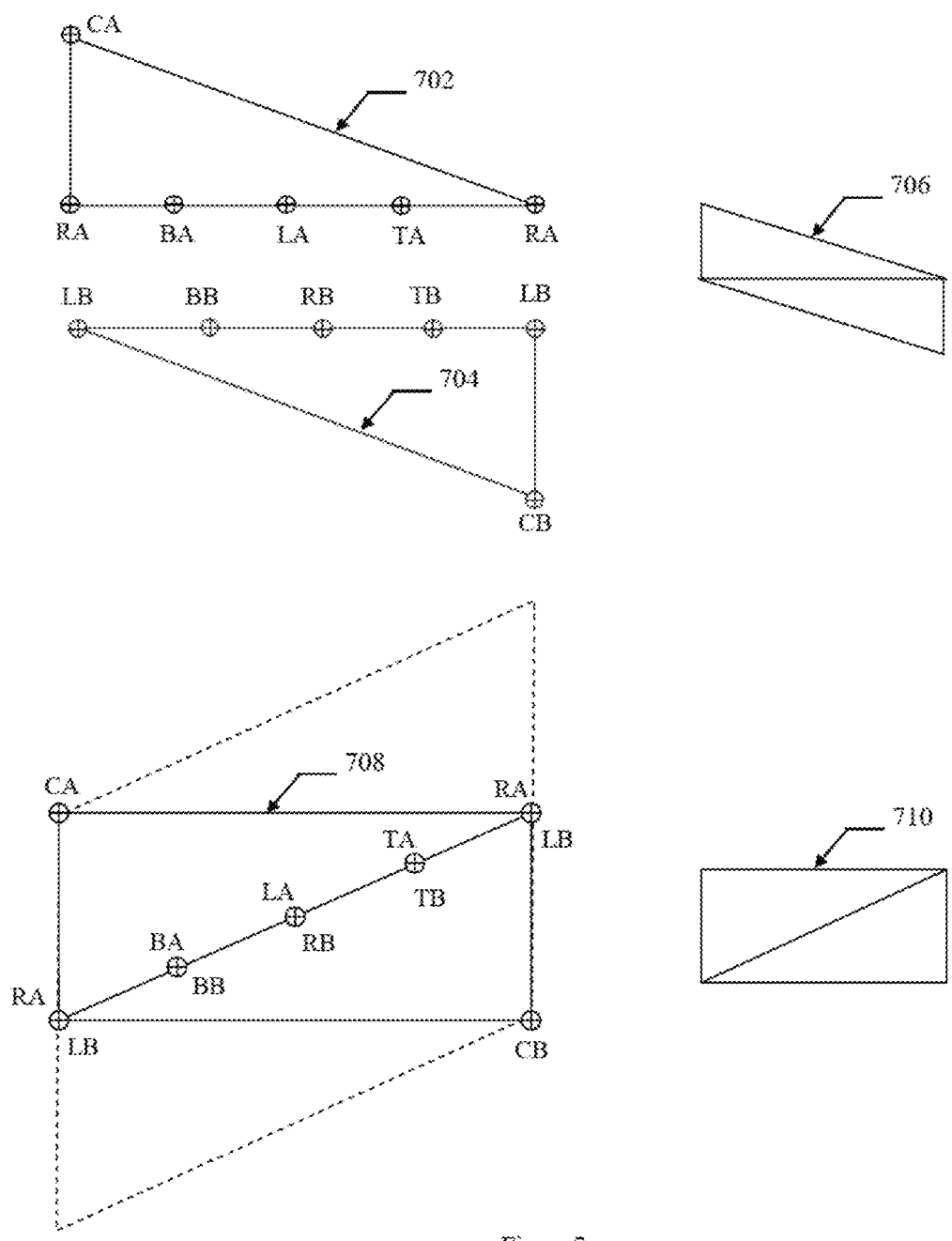
FIG. 7 is a flow diagram illustrating an exemplary process of stitching the two triangular images into a single image and orienting the same.

The RASTER IMAGES BUFFER (140) delivers the two source raster images (300) and (310) to the IMAGE PROCESSOR CIR to TRI (320) with the selection information provided by the module (180) of FIG. 2. The IMAGE PROCESSOR (320) processes the transformation of each pixel on the selection of each (300) and (310) as explained below. The resulting information is 2 raster images (330) and (340). Then, the raster image (340) is processed through the IMAGE PROCESSOR ROTATION (350) where a 180 degrees rotation is operated to the all pixels information as shown in FIG. 7. The resulting data (360) is then loaded into the IMAGE MUX (370), the multiplexer, as explained with FIG. 7 (702 to 706) as the MUX RASTER IMAGE (400). The resulting raster image is then only one image.

This image data is then processed through the IMAGE PROCESSOR PIXEL MOVER (410), where each pixel is moved as shown in FIG. 7 (708-710) to produce a raster image (420).

The image is then cropped by the IMAGE PROCESSING CROPPING MODULE (430), to result a final rectangular CROPPED IMAGE (440) that is delivered to the STITCHED IMAGE BUFFER (160). This last step completes the stitching process.

FIGS. 4-7 illustrate an exemplary stitching process as disclosed by the method of the instant invention.

Figure 4:
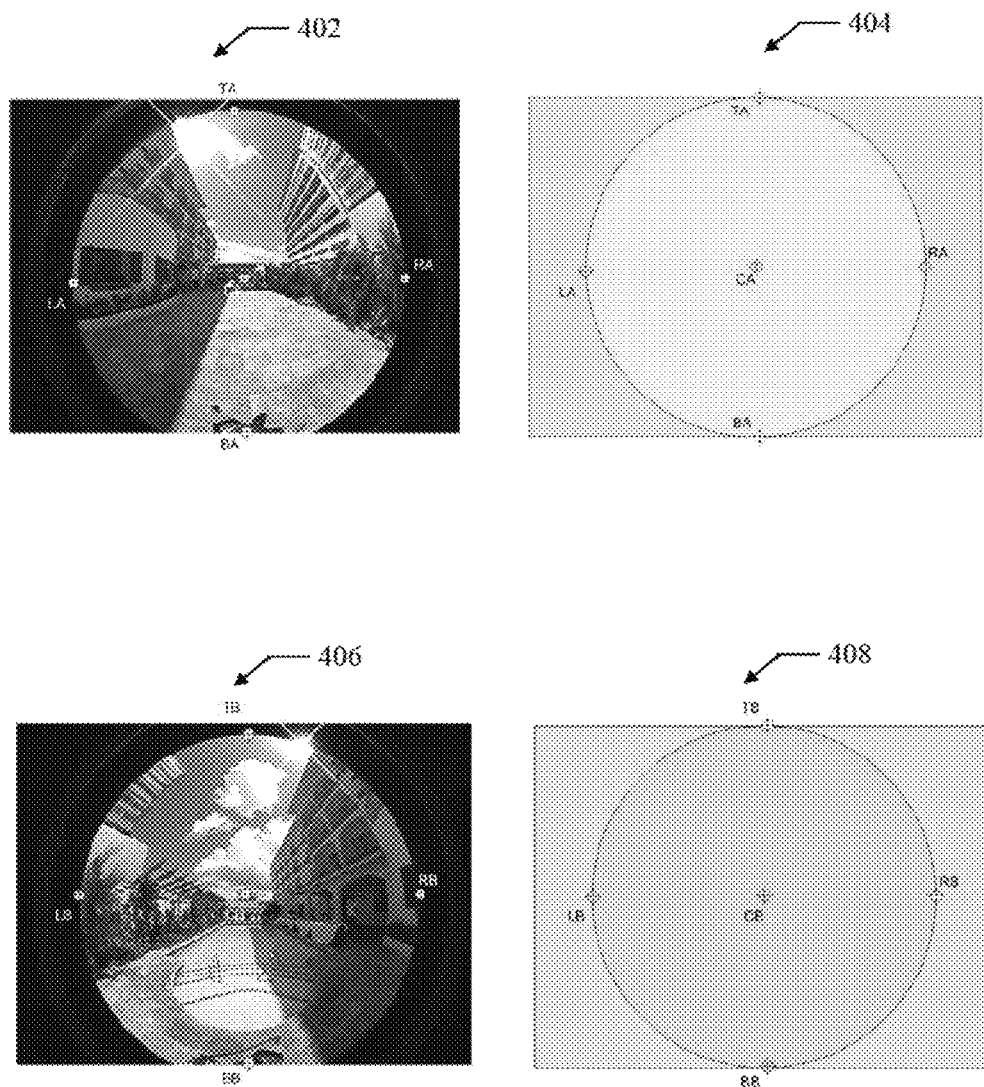
FIG. 4 is a diagram illustrating two exemplary hemispherical images, their simplified diagrams and end coordinates.

FIG. 4 is a diagram illustrating the two hemispherical images, their simplified diagrams and end coordinates. Two or more images can be captured by the fish eye lens in image capture means. Figure element 402 shows the front view of a scene captured by image capture means comprising a fisheye lens. Figure element 404 represents a simplified image of the Figure element 402 illustrating the coordinates of the centre and four end points of the captured image. Similarly, Figure element 406 shows the back view of the captured scene. Figure element 408 represents a simplified image of the Figure element 406 illustrating the coordinates of the centre and four end points of said image. In FIG. 4:

TA refers to top point hemisphere 402
TB refers to top point hemisphere 406
LA refers to left point hemisphere 402
LB refers to left point hemisphere 406
RA refers to right point hemisphere 402
RB refers to right point hemisphere 406
BA refers to bottom point hemisphere 402
BB refers to bottom point hemisphere 406
CA refers to center point hemisphere 402
CB refers to center point hemisphere 406

Figure 5:
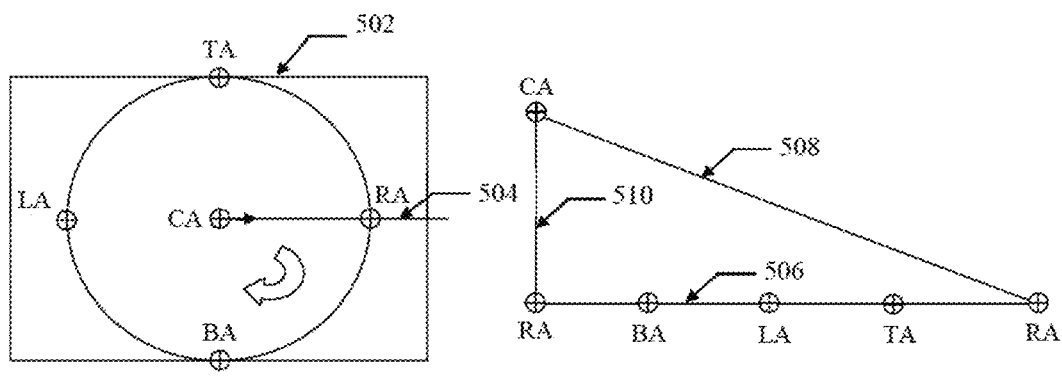
FIG. 5 is a block diagram illustrating an exemplary method of the conversion of each hemispherical image into a triangular image.
Figure 5:
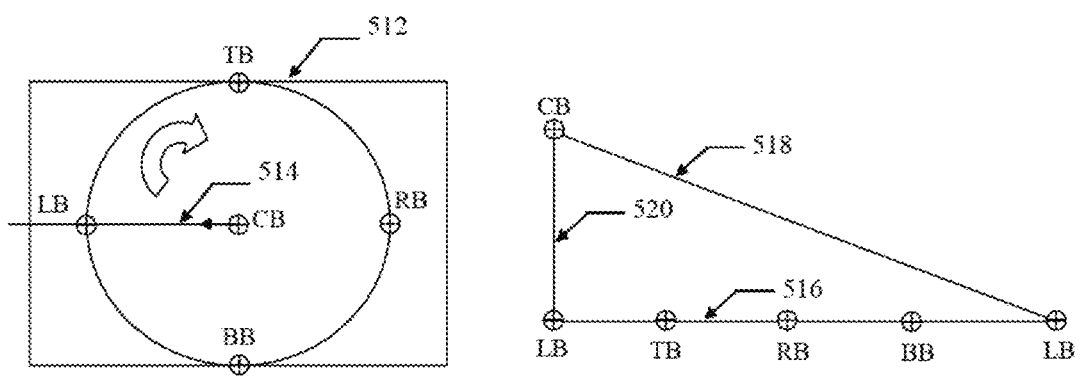

FIG. 5 is a flow diagram illustrating the conversion of each hemispherical image into an equivalent triangular image. Figure element 502 represents the circumference or the perimeter of the hemisphere representing the front view of a scene captured by a fisheye lens. Figure element 504 represents the ray CARA originating at the centre of the hemisphere. One or more elements of the hemisphere are translated into elements of the corresponding triangular image. The base 506 of the triangle, represented by RABALATARA, is formed by the perimeter line 502, i.e., TARABALA of the corresponding hemisphere. While the hypotenuse 508 and perpendicular 510 of the triangular image are represented by figure element 504, i.e., the ray CARA of the hemisphere.

Similarly, the hemisphere representing the back view of a scene captured by a fisheye lens is converted to an equivalent triangle. The base 516 of the triangle, represented by LBT-BRBBBLB, is formed by the perimeter line 512, i.e., LBT-BRBBBLB of the corresponding hemisphere. While the hypotenuse 518 and perpendicular 520 of the triangular image are represented by figure element 514, i.e., the ray CBLB of the hemisphere. Thus, each pixel of each hemisphere follows the above transformation and is then located on the new triangle shape and obtains the positions as shown in FIG. 5.

Figure 6:
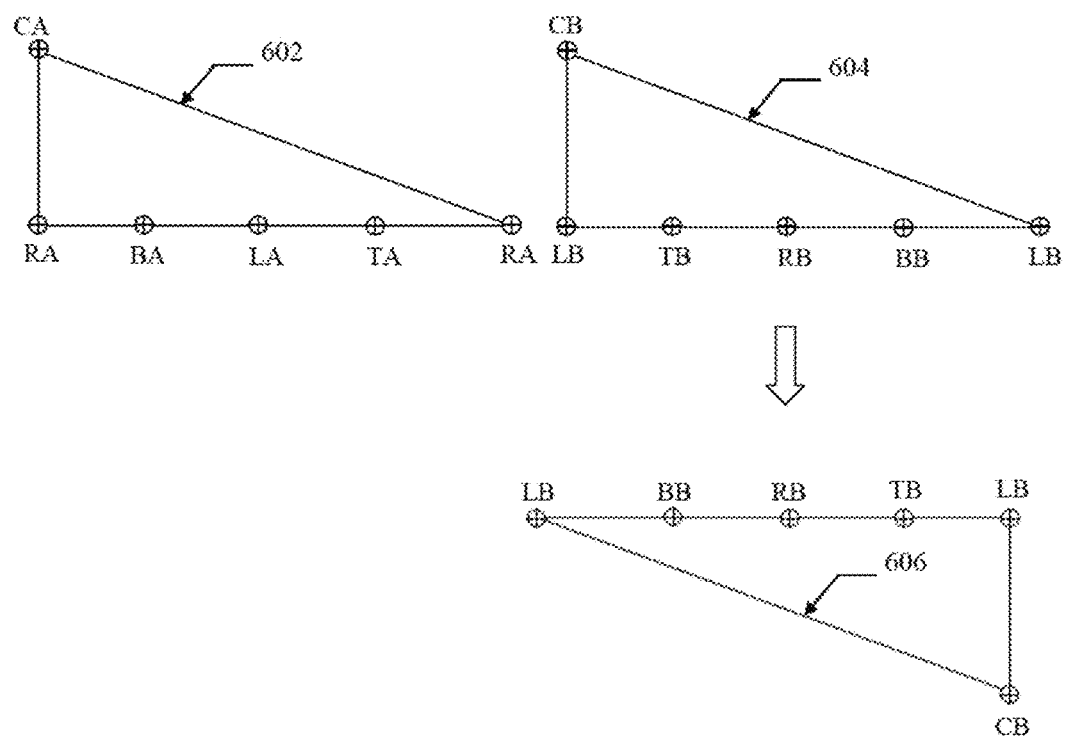
FIG. 6 is a block diagram illustrating an exemplary process of changing the orientation of the triangular images.

FIG. 6 is a flow diagram illustrating the process of changing the orientation of the triangular image. One or more triangles are rotated by 180 degrees along one or more axes to position them for stitching with one or more images. In FIG. 6, triangles 602 and 604 represent the triangular images formed by the hemisphere representing the front and back view of a captured scene respectively. Triangle 604 undergoes a 180 degrees rotation as illustrated in FIG. 6 resulting in triangle 606. We can consider that the original shape was transformed using 2 flip mirror functions, similar to a 180 degrees rotation. Now, triangle 606 is in a favorable orientation to be stitched with triangle 602 representing the front view of a captured scene as disclosed in the description of FIG. 7.

FIG. 7 is a flow diagram illustrating the process of stitching the two triangular images into a single image and orienting the same. A plurality of elements of the original images is extracted and stored for further processing. Further, the elements common to two or more images are also identified. For stitching a triangular image 702 with the flipped triangular images 704 corresponding points of the triangles representing common elements are identified. The corresponding points of triangles 702 and 704 are represented by RA & LB, BA & BB, LA & RB, TA & TB and RA & LB in FIG. 8. Subsequently, the corresponding points of the triangles 702 and 704 are combined or assembled along the hypotenuse of the two triangles 702 and 704 to result in the stitched image 706.

Finally, a vertical translation is performed on the edge RA.LB and CB line to obtain an equirectangular image. In the resultant equirectangular image, each single pixel at the beginning represents one single pixel at the end of the process thus comprises of the same concentration of pixels at the end as was in the initial images to be stitched. Moreover, the size of the end image in terms of its storage space is reduced by at least 22%. Thus, the disclosed method and system of the instant invention generates a stitched image of superior quality from two or more images than a standard equirectangular image.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

It will readily be appreciated by those skilled in the art that the present invention is not limited to the specific embodiments shown herein. Thus variations may be made within the scope and spirit of the accompanying claims without sacrificing the principal advantages of the invention.

I claim:

1. A method for stitching two or more images comprising the steps of:
   capturing two or more images from at least one point and different directions of view by an image capture means to result in hemispherical images;
   converting each hemispherical image into a corresponding triangular image;
   orienting at least a first triangular image along an edge of at least a second triangular image wherein an edge of the first triangular image corresponds to the edge of the second triangular image; and
   combining common points on the edge of the first triangular image with the corresponding points on the edge of the second triangular image to form a single stitched image.

2. The method of claim 1, wherein the step of converting comprises the steps of:
   representing each of the hemispherical images by a corresponding circle;
   representing the base of the triangle by the perimeter of the circle; and representing the perpendicular and hypotenuse of the triangle by a ray originating from centre of the circle to the edge of the circle.

3. A computer program product for stitching two or more images, comprising one or more non-transitory computer readable media configured to perform the method as claimed in claims 2.

4. The method as claimed in claim 1, wherein the step of orienting comprises the step of rotating at least a first triangular image by 180 degrees.

5. A computer program product for stitching two or more images, comprising one or more non-transitory computer readable media configured to perform the method as claimed in claims 4.

6. The method as claimed in claim 1, wherein the step of combining points on the edge of the first triangular image with the corresponding points on the edge of the second triangular image comprises the steps of: determining common points on the edge of the first triangular image corresponding to the edge of the second triangular image; combining the edge of the first triangular image with the edge of the second triangular image along the common points to form a single stitched image; and translating one or more sides of the single image to form a rectangular stitched image.

7. A computer program product, for stitching two or more images, comprising one or more non-transitory computer readable media configured to perform the method as claimed in claims 6.

8. The method, as claimed in claim 1, wherein the stitched image is a rectangular image with the same pixel concentration as the original hemispherical images.

9. A computer program product for stitching two or more images, comprising one or more non-transitory computer readable media configured to perform the method as claimed in claim 8.

10. A computer program product for stitching two or more images, comprising one or more non-transitory computer readable media configured to perform the method as claimed in claim 1.

11. A system for stitching two or more images comprising:
 image capture means for capturing two or more hemispherical images from at least one point and different directions of view; and
 image processing means coupled to the image capture means to convert two or more hemispherical images into triangular images and combine the triangular images into a single stitched image.

12. The system of claim 11, wherein the image capture means includes at least one wide angle lens.

13. The system of claim 11, wherein the image capture means captures still and moving images.

14. The system of claim 11, wherein the stitched image is a rectangular image with the same pixel concentration as the hemispherical images.

15. The system of claim 11, wherein the system further comprises:
 storage to store captured images, intermediate and stitched images and related image processing information; and
 output to display captured intermediate and stitched images.

16. The system of claim 15 wherein the system is communicatively coupled to a communication network.

17. The system of claim 11, wherein the system is communicatively coupled to a communication network.

\* \* \* \* \*